March 15, 1927.

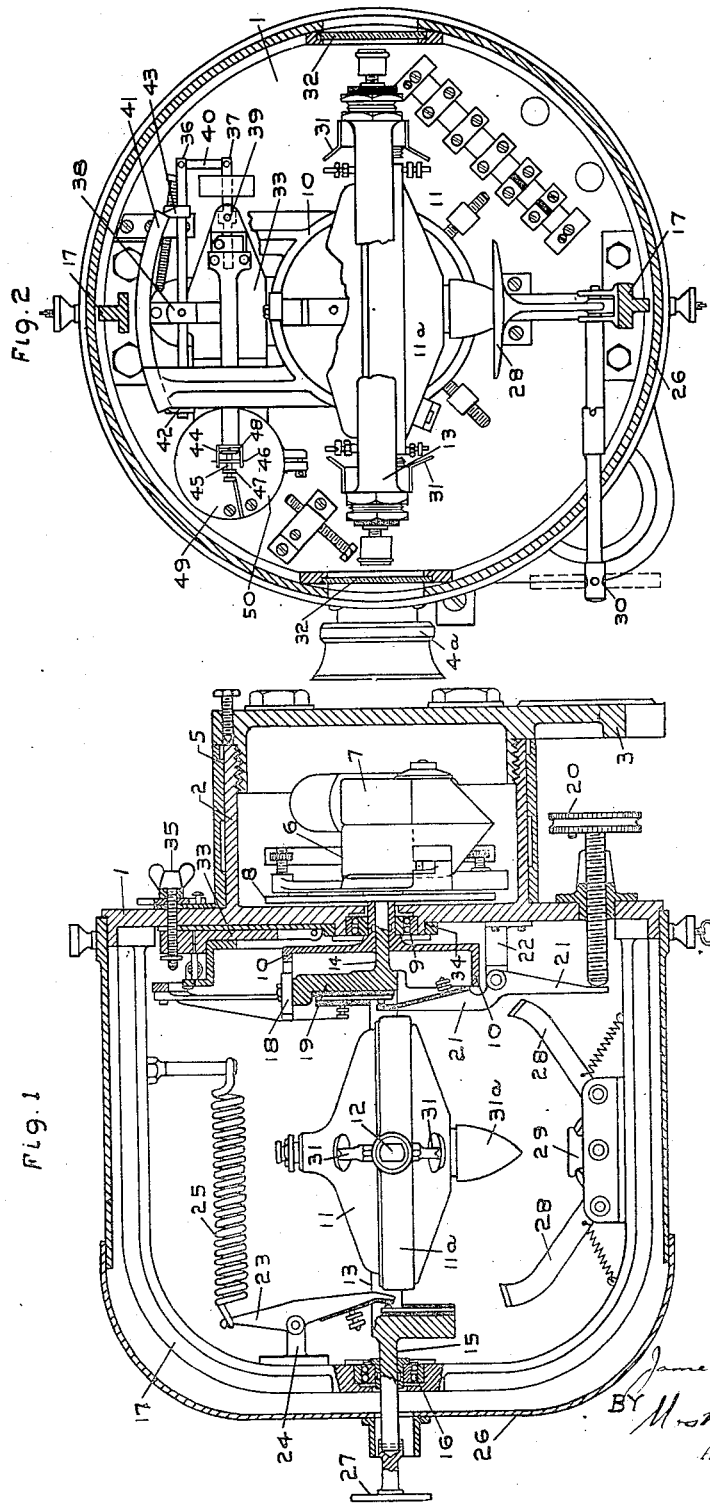

J. B. HENDERSON 1,621,201

FIRE CONTROL APPARATUS

Original Filed July 26, 1919    2 Sheets-Sheet 2

INVENTOR.
James B. Henderson
BY Moakley and Gill
ATTORNEYS.

Patented Mar. 15, 1927.

1,621,201

UNITED STATES PATENT OFFICE.

JAMES BLACKLOCK HENDERSON, OF BLACKHEATH, ENGLAND.

FIRE-CONTROL APPARATUS.

Original application filed July 26, 1919, Serial No. 313,542, and in Great Britain November 25, 1915. Divided and this application filed September 16, 1924, Serial No. 738,027. Renewed July 28, 1926.

My co-pending application referred to above relates to sighting devices such as gun sights, bomb-droppers, range finders, position finders, artificial horizons, or in general any optical sighting device for use on board ship or on an airship or aeroplane or on any other moving platform, by which the effects of the angular motion of the ship, aeroplane or platform are eliminated so that the image of the target or other object viewed through the telescope may be stationary in the focal plane of the telescope irrespective of its angular motion, the external object being designated as the target and the moving platform being designated as the ship.

More particularly the apparatus disclosed in the application consists of a sighting device having a frame or casing adapted to be carried on a ship, aeroplane or angularly moving platform so that it shall partake of the angular motion thereof, there being a telescopic optical system, a fire-control apparatus and a stabilized gyroscope.

The telescopic system has optical parts which are under the control of the stabilizing gyroscope, whereby a distantly viewed object is maintained in the telescopic field of view despite the movement imparted to other parts of the telescopic system by the rolling pitching or yawing of the craft.

Similarly, the fire-control apparatus is responsive to both the gyroscopic control and to motion derived from the ship, or angularly moving platform, said fire-control apparatus including an electric switch for firing the guns.

This application relates particularly to the fire-control features of my co-pending application referred to above particularly with respect to controlling the firing of guns or other pieces of ordnance at predetermined positions during the natural movements of the ship on which they are mounted, the compensation for the effect of straying of the gyroscope on the time of firing and the provision of optical means for detecting straying in order that such compensation may be made.

Figure 3:
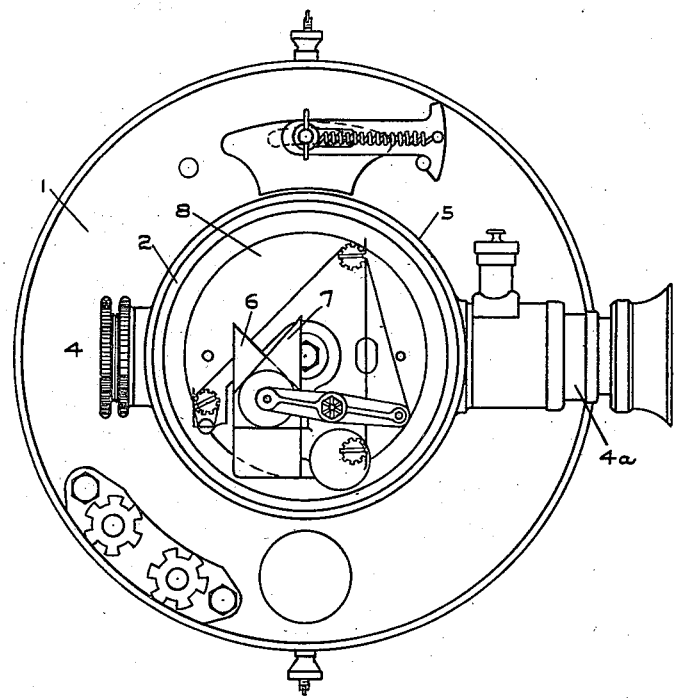
Figure 3A:
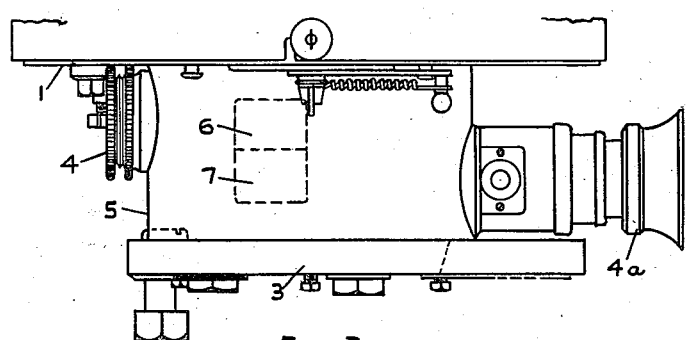

The particular nature of the invention, as well as other objects and advantages thereof will appear more clearly from a description of a preferred embodiment as shown in the accompanying drawings in which Fig. 1 is a central elevation through a fire-control apparatus constructed in accordance with the invention. Fig. 2 is a sectional elevation approximately along the line 2—2 of Fig. 1. Fig. 3 is an end view of Fig. 1 with part of the casing removed to more clearly show the optical parts. Fig. 3[a] is a plan view of the telescope portion of the apparatus.

The main frame of the telescope consists of a disc 1, carrying a circular tubular projection 2 which serves as the case of the telescope and also as the support of the instrument because this tube screws on to the bracket 3 which is mounted on the sight pedestal. The telescope consists of the objective 4 and the eyepiece 4[a] (Fig. 3) carried by the ring 5 which fits on the outside of the tube 2 but is capable of being turned relatively to this tube, oval slots being cut in the tube to pass the telescope beam. The prisms 6 and 7 of the telescope are rigidly attached to the prism plate 8 which is pivoted on the frame 1 on the ball bearing 9. Compound with the prism plate but on the opposite side of the disc 1, is the cylinder 10. The prism plate and cylinder 10 are stabilized by a gyroscope in its casing 11 (Fig. 1) which fits into a ring 11[a] supported on a horizontal trunnion axis 12 on the gimbal ring 13 so that the gyro rotor axis is approximately vertical. The gimbal ring is supported at one end by the trunnion 14 which slides into the prism plate axially and at the other end by a trunnion 15 which slides axially in a bearing 16, supported from the disc 1 by the U bracket 17. The gyro 11 and its supporting ring 11[a], have small gravitational stability on the trunnions 12 due to the weight 31[a] and the trunnion axis 12 is below the level of the trunnion axis 14—15 so as to give increased stability about the latter axis.

The prism plate 8 has an angular adjustment relatively to the trunnion 14 of the gimbal ring. This may be brought about in several different ways but in Fig. 1 it is brought about by a roller 18 carried by a short pillar 19 attached to the gimbal ring 13. This roller engages in a helical slot in the cylinder 10 so that when the gimbal ring is slid bodily in the direction of the axis of the trunnion 14—15, the prism plate turns about the axis of these trunnions. This translation of the gimbal ring as a whole is brought about by the screw 20 which rocks the lever 21 about its fulcrum on pillar 22 and moves the upper end of the lever to the right or left according as the screw 20 is screwed in or out. The upper end of the lever 21 bears against a ball centre attached to the gimbal ring, concentric with the trunnion 14, and the similar lever 23 presses against a similar ball centre concentric with the trunnion 15. The spring 25 acting through the lever 23 and its fulcrum on the pillar 24 serves to keep the gimbal ring always pressed against the lever 21 and the lever 21 pressed against the screw 20.

The gyro 11 can be caused to precess about the trunnion axis 12 by means of the handle 27 which fits on the end of the trunnion 15, outside the cover 26. It can also be caused to precess about the trunnion axis 14—15 by means of one or other of the two levers 28 which can be turned by the cam 29 and the handle 30 (Fig. 2) projecting through the cover 26. Each lever 28 is fitted with a T head as shown in Fig. 2 and when the T head touches the weight 31ª attached to the gyro case 11 the gyro precesses round the trunnions 14—15, and carries the prism plate 8 with it. This precession is only used as a very rough adjustment, the screw 20 providing the fine adjustment. The gyro rotor axis is kept approximately perpendicular to the gimbal ring 13 by means of the handle 27, the relative position of the gyro case and gimbal ring being indicated by the pointers and scales 31 (Fig. 1) which are visible through the windows 32 in the outer cover 26.

The electric current may be led in to the gyro by flexible insulated connections at each trunnion or by insulated spring plug connections incorporated in the trunnions, but which since they form no part of this invention are not shown in the drawing.

The switch controlling the firing circuit of a gun consists of a switch plate 33 which is pivotally mounted on a cylindrical sleeve 34 on the disc 1 concentric with the disc. A small angular motion of the switch plate 33 round the disc centre can be brought about by means of the pin 35 which projects through a slot in the disc. The switch plate carries the levers 36 and 37 which are pivotally mounted on their respective fulcra 38 and 39 and are interconnected by the link 40, so that a small angular motion of lever 36 produces a larger angular motion of lever 37. The angular motion of the lever 36 is produced by the trigger 41 which is carried by the cylinder 10 engaging with one or other of the two small pins 42—43 on the lever 36. A small angular motion of the lever is thus produced after the manner of an escapement. The lever 37 carries, insulated on its end, the fork 44 which supports a small metal cross 45 on pivots 46 and the cross carries two small rollers 47 and 48 attached to a common spindle passing through the cross. The roller 48 is slightly smaller in diameter than 47 because of its smaller distance from the fulcrum 39. These rollers roll over the surface of the two semi-circular metal segments 49 and 50 which are insulated from each other and also from the switch plate 33 by which they are carried. The line of insulation between the two segments is seen in Fig. 2 to be inclined to the lever 37 in its central position so that during the motion of this lever the roller 47 is for a short time touching the plate 49 while the roller 48 is touching the plate 50. The spindle of the two rollers then serves as the electrical connection between the two plates and closes the firing circuit either directly or through a relay.

The motion of the switch plate about the sleeve 34 serves to bring the closing of the firing circuit into phase with the passage of the target across the cross wires of the ordinary layers telescope in director control.

When the sight is mounted directly on a gun I may apply a tangent screw adjustment to this motion of the switch plate and graduate the tangent screw in ranges. If the telescope be kept on the target after setting the range and if the gun be slowly elevated it will fire when it reached the proper elevation for the particular range of the target.

The optical advantages of the above arrangement of telescope over those described in my previous British Patents Nos. 3,683 and 6,977 of 1915 are (1) the objective and eyepiece are normally on the same level and the parallax error due to any angular motion of the disc 1 round the trunnion 14 is less than it would be if the objective and eyepiece were not normally on the same level, (2) with the prisms stabilized so that the telescope beam always enters and leaves the prisms perpendicular to the surface of the glass the chromatic aberration produced by the prisms is constant and can be compensated by a suitable want of acromatism in the objective, (3) the objective and focal plane are brought as close as possible to the axis of the instrument commensurate with a given focal length and a given length of instrument parallel to the trunnion axis. By elongating the cylindrical case of the telescope the diameter of the case may be reduced and so the objective and focal plane may be brought closer to the axis and by rearranging the parts both cross wires and objective might be placed on the axis and both incorporated in the stabilized system.

I claim:

1. In gun-fire control apparatus, an angularly movable frame, a gyroscope pivotally mounted therein and displaceable longitudinally of a pivotal axis of its mounting in the frame, target position indicating means, an electric switch having relatively movable contacts, actuating mechanism for said switch under the joint control of said frame and gyroscope and an adjusting connection operable by displacement of said gyroscope to adjust said target position indicating means and the switch contacts.

2. In gun-fire control apparatus, an angularly movable frame, a gimbal ring pivotally and slidably mounted therein, a gyroscope mounted to stabilize said gimbal ring, an electric switch having relatively movable contacts, switch-actuating mechanism comprising a trigger under the control of said gimbal ring and yielding members operable by the movement of said frame to react against said trigger, and means to slide said ring thereby causing said switch-actuating mechanism to adjust said switch contacts.

3. In gun-fire control apparatus, an angularly movable frame, a gimbal ring pivotally and slidably mounted therein, a gyroscope carried by said gimbal ring, an electric switch, switch-actuating means comprising a trigger controlled by said gimbal ring and a yielding oscillatory member connected to said switch and operable by relative movement of said frame and gyroscope to react against said trigger, target position indicating means and means responsive to a sliding motion of said gimbal ring to adjust said switch to said target indicating means.

4. In gun-fire control apparatus, an angularly movable frame, a gimbal ring pivotally and slidably mounted therein, a gyroscope stabilizing said gimbal ring, means urging said gimbal ring in one direction, target position indicating means, an electric switch, switch-actuating mechanism, comprising a trigger controlled by said gimbal ring and a yielding oscillatory member connected to said switch and operable by relative movement of said frame and gyroscope to react against its said trigger, shifting means to move said gimbal ring against its said urging means and means responsive to said shifting means to relatively adjust said switch and target position indicating means.

5. In gun-fire control apparatus, an angularly movable frame, a gimbal ring slidably mounted therein, a gyroscope for stabilizing said gimbal ring, an electric switch, and switch-actuating mechanism comprising a trigger and an oscillatory member operable to react one against the other and one of which has a stabilizing connection with said gimbal ring.

6. In gun-fire control apparatus, an angularly movable frame, a gimbal ring slidably mounted therein, a gyroscope mounted to stabilize said gimbal ring, an electric switch, an adjustable member under the control of said gimbal ring and switch-actuating means comprising a trigger and an oscillatory member operable to react one against the other and one of which is mounted on said adjustable member, the latter being responsive to a sliding of said gimbal ring to adjust said electric switch.

7. In gun-fire control apparatus, an angularly movable frame, a gimbal ring slidably mounted therein, a gyroscope mounted to stabilize said gimbal ring, gimbal ring shifting means automatically operable in one direction, a regulatory control for the ring operable in the reverse direction, an electric switch, and switch-actuating mechanism under the combined control of said gimbal ring and frame stabilized in part by the former and adjustable by a sliding movement of said gimbal ring.

8. In gun-fire control apparatus, an angularly movable frame, a gimbal ring slidably mounted therein, a gyroscope mounted to stabilize said gimbal ring, an electric switch, actuating means therefor operable by relative movement of said frame and gimbal ring, and regulatory elastic gimbal ring shifting means operable to effect an adjustment of said switch.

9. In gun-fire control apparatus, an angularly movable frame, an electric switch, and switch actuating means gyroscopically stabilized in part and responsive to angular movements of said frame, said switch comprising adjacent insulated contacts, a movement-multiplying arms and a plurality of separated electrically connected contacts movable by said arm into engagement with one or a plurality of said first mentioned contacts.

10. In gun-fire control apparatus, an angularly movable frame, an electric switch, a support therefor adjustably secured to said frame, and switch-actuating means gyroscopically stabilized in part and responsive to angular movements of said frame, said switch comprising electrically separated contacts stationary with respect to said switch support, a movement-multiplying arm and a plurality of electrically connected rollers adapted to be positioned to span the separation of said first mentioned contacts or to engage a single one thereof.

11. In gun-fire control apparatus, an angularly movable frame, a gyroscope pivotally mounted therein to be capable of being shifted with respect thereto, target position indicating means, an electric switch, and actuating mechanism therefor under the joint control of said frame and gyroscope and an adjusting connection between said gyroscope and target position indicating means operable by a shifting of the former to adjust the latter.

12. In gun-fire control apparatus, an angularly movable frame, a gyroscope pivotally mounted therein to be capable of being shifted with respect thereto, target position indicating means, an electric switch having relatively movable contacts, and actuating means therefor under the joint control of said frame and gyroscope operable by a shifting of the latter to adjust the relatively movable switch contacts.

13. In fire-control apparatus for use on an angularly displaceable support, a telescope provided with a movable reflecting device, a gyroscope, a mounting therefor adapted to be stabilized thereby, a firing gear including a pivotally mounted element yieldingly combined with said gyroscope mounting and operatively connected to said reflecting device, a trigger carried by said element, and means operable to relatively displace said mounting and element to effect simultaneous adjustment of said reflecting device and trigger.

14. In fire-control apparatus for use on an angularly displaceable support, an adjustable optical system, a firing gear operatively connected with said system and comprising a pivoted member, a trigger carried thereby, an escapement co-acting with said trigger, a lever actuated by said escapement, an electrical bridging contact carried by said lever, a pair of electrically insulated contacts adapted to be electrically connected by said bridging contact, a gyroscope, a mounting therefor stabilized thereby, an adjustable connection normally maintaining said mounting and pivoted number in mutually fixed relation, and means for adjusting such relation and said optical system.

15. In fire-control apparatus for use on an angularly displaceable support, a firing gear comprising a bridging contact having terminals spaced from each other on an axial line, mutually insulated contacts adapted to be spanned by said bridging contact and being electrically separated from each other along a line placed at an angle to said axial line on which the spaced terminals of said bridging contact are located, a gyroscope, and means subject to a joint control by the angularly displaceable support and said gyroscope operable to relate said bridging contact with one or more of said mutually insulated contacts.

16. In fire-control apparatus for use on an angularly displaceable support, a frame, a telescope provided with a movable reflecting device, a gyroscope, a gimbal ring therefor stabilized thereby and having trunnions slidably mounted in said frame, the latter being adapted to turn about said trunnions, a firing gear including a pivotally mounted element having a cam and follower relation with said gimbal ring and controllingly combined with said reflecting device, and means to slide said gimbal ring to alter said cam and follower relation between said gimbal ring and element to adjust said reflecting device and firing gear.

17. In fire-control apparatus for use on an angularly displaceable support, a frame, a telescope provided with a movable reflecting device, a gimbal ring, trunnions therefor slidably mounting the same with respect to said frame, a gyroscope pivotally mounted in said gimbal ring adapted to stabilize the latter, a firing gear comprising a pivoted element controllingly connected with said reflecting device, a cam and a follower therefor one being associated with said element and the other with said gimbal ring, means to actuate said cam and follower to effect adjustment of said firing gear and reflector, means for precessing the gyroscope about the axis of the gimbal ring trunnions and means for precessing it about the axis of its own pivotal support.

18. In fire-control apparatus for use on an angularly displaceable support, a frame movable about an axis as the support is displaced, an adjustable telescopic system and a stabilizing gyroscope mounted in said frame, a firing gear under the joint control of said frame and gyroscope and comprising a bridging contact having spaced apart contact-making portions, mutually insulated contacts adapted to be singly engaged and electrically connected by said bridging contact at different times, said mutually insulated contacts being electrically separated along a line placed angularly to a median line extending through the contact-making portions of said bridging contact when the latter electrically connects said mutually insulated contacts, and means for adjusting the telescopic system and the firing gear contacts.

In testimony whereof I affix my signature.
JAMES BLACKLOCK HENDERSON.